(12) United States Patent
Wöhrle et al.

(10) Patent No.: US 10,665,860 B2
(45) Date of Patent: May 26, 2020

(54) COMPOSITE ANODE FOR A GALVANIC CELL AND A GALVANIC CELL

(71) Applicant: Robert Bosch GmbH, Stuttgart (DE)

(72) Inventors: Thomas Wöhrle, München (DE); Calin Iulius Wurm, Meitingen (DE); Vikram Anil Godbole, Leinfelden (DE)

(73) Assignee: Robert Bosch GmbH, Stuttgart (DE)

(*) Notice: Subject to any disclaimer, the term of this patent is extended or adjusted under 35 U.S.C. 154(b) by 40 days.

(21) Appl. No.: 15/505,979

(22) PCT Filed: Aug. 3, 2015

(86) PCT No.: PCT/EP2015/067782
§ 371 (c)(1),
(2) Date: Feb. 23, 2017

(87) PCT Pub. No.: WO2016/030142
PCT Pub. Date: Mar. 3, 2016

(65) Prior Publication Data
US 2017/0271669 A1    Sep. 21, 2017

(30) Foreign Application Priority Data

Aug. 25, 2014  (DE) .................. 10 2014 216 839

(51) Int. Cl.
*H01M 4/485* (2010.01)
*H01M 4/38* (2006.01)
(Continued)

(52) U.S. Cl.
CPC ............. *H01M 4/485* (2013.01); *H01M 2/02* (2013.01); *H01M 4/364* (2013.01); *H01M 4/38* (2013.01);
(Continued)

(58) Field of Classification Search
CPC .... H01M 4/485; H01M 2/02; H01M 10/0525; H01M 4/587; H01M 4/386; H01M 4/364; H01M 4/525
(Continued)

(56) References Cited

U.S. PATENT DOCUMENTS

2007/0148545 A1   6/2007  Amine et al.
2009/0123813 A1 * 5/2009  Chiang .................. C01B 25/45
                                                      429/50
(Continued)

FOREIGN PATENT DOCUMENTS

CN    101409344 A       4/2009
CN    102800866 A  *  11/2012
(Continued)

OTHER PUBLICATIONS

International Search Report corresponding to PCT Application No. PCT/EP2015/067782, dated Oct. 14, 2015 (German and English language document) (5 pages).
(Continued)

*Primary Examiner* — Gary D Harris
(74) *Attorney, Agent, or Firm* — Maginot, Moore & Beck LLP

(57) ABSTRACT

An anode for a galvanic cell is constructed from an anode material containing a main component, which releases lithium ions during a discharge process of the galvanic cell, and at least one additive. The at least one additive has an electrochemical potential which is higher with respect to elemental lithium than an electrochemical potential of the main component with respect to elemental lithium. The at least one additive has a charging capacity and a discharging capacity, and the charging capacity does not deviate from the discharging capacity by more than 10%.

10 Claims, 3 Drawing Sheets

(51) Int. Cl.
 H01M 4/525 (2010.01)
 H01M 4/587 (2010.01)
 H01M 4/36 (2006.01)
 H01M 2/02 (2006.01)
 H01M 10/0525 (2010.01)
 H01M 10/052 (2010.01)
(52) U.S. Cl.
 CPC ........... H01M 4/386 (2013.01); H01M 4/525 (2013.01); H01M 4/587 (2013.01); H01M 10/0525 (2013.01); H01M 10/052 (2013.01)
(58) Field of Classification Search
 USPC ........................................................ 429/209
 See application file for complete search history.

(56) References Cited

U.S. PATENT DOCUMENTS

| | | | |
|---|---|---|---|
| 2010/0076523 A1 | 3/2010 | Howard et al. | |
| 2012/0100426 A1 | 4/2012 | Kim et al. | |
| 2012/0270108 A1* | 10/2012 | Shin .................. | B82Y 30/00 429/226 |
| 2013/0052538 A1* | 2/2013 | Pasta .................. | H01M 4/362 429/245 |
| 2014/0227584 A1* | 8/2014 | Holstein ........... | H01M 10/0525 429/163 |

FOREIGN PATENT DOCUMENTS

| | | | | |
|---|---|---|---|---|
| CN | 103236519 A | | 8/2013 | |
| CN | 103545502 A | | 1/2014 | |
| CN | 102800866 B | * | 1/2016 | |
| CN | 105247715 A | | 1/2016 | |
| EP | 1530248 A2 | * | 5/2005 | ........ H01M 10/0525 |
| EP | 1530248 A2 | | 5/2005 | |
| EP | 2 515 365 A1 | | 10/2012 | |
| JP | 2010129481 A | | 6/2010 | |
| KR | 2007-0108579 A | | 11/2007 | |
| WO | 2013/187707 A1 | | 12/2013 | |

OTHER PUBLICATIONS

Poizot et. al., Nano-Sized transition-metal oxides as negative-electrode materials for lithium-ion batteries, Nature, Sep. 28, 2000, pp. 496-499, vol. 407, Macmillan Magazines, Ltd., www.nature.com.

Morcrette et al., A reversible copper extrusion-insertion electrode for rechargeable Li batteries, Nature Materials, Nov. 2003, published online Oct. 26, 2003, pp. 755-761, vol. 2, www.nature.com/naturematerials.

* cited by examiner

COMPOSITE ANODE FOR A GALVANIC CELL AND A GALVANIC CELL

This application is a 35 U.S.C. § 371 National Stage Application of PCT/EP2015/067782, filed on Aug. 3, 2015, which claims the benefit of priority to Serial No. DE 10 2014 216 839.2, filed on Aug. 25, 2014 in Germany, the disclosures of which are incorporated herein by reference in their entirety.

BACKGROUND

The present disclosure relates to an anode for a galvanic cell and a galvanic cell having this anode.

Rechargeable galvanic cells, for example, battery cells having an anode containing lithium, have a very high available energy density or specific energy, in particular in comparison to battery cells based on nickel-metal hydride or lead-acid. Lithium-ion batteries may be used both in partially or completely electrically powered vehicles, electric vehicles or hybrid vehicles, and in computer technology, in particular in notebooks, smartphones, or tablet PCs. Lithium-ion cells have at least one positive electrode (cathode) and at least one negative electrode (anode), which are able to reversibly intercalate or again deintercalate lithium ions. Rechargeable batteries, also referred to as secondary batteries, are parallel or serial combinations of at least two individual electrically connected accumulators or battery cells. These batteries are also referred to as a battery pack or battery module.

Batteries having different chemical systems, such as lead-acid, nickel-metal hydride, and lithium-ion, are available on the market in various design forms, such as button cells, cylindrical cells, prismatic cells, and stacked or wound anode-separator-cathode ensembles.

One presently used design form is a prismatic lithium-ion battery having a fixed housing, for example, made up of aluminum, also referred to as a hard case. The prismatic battery having a fixed housing includes windings, also referred to as jelly rolls, which in turn include a cathode, an anode, and a separator which is impregnated with liquid lithium ion-conducting electrolyte. The anode is frequently made up of a mixture of an active graphite material, an electrically conductive additive such as conductive carbon black, and an electrode binder. The anode is generally deposited on a copper-based current collector foil. The windings are then connected to current collectors, and the complete structure is hermetically sealed in an aluminum container or a stainless-steel container. Several of such cells are assembled together with a battery management system (BMS) into a complete battery module or into a battery store.

Generally, a lithium-ion cell, which includes a transition metal oxide cathode having a layer structure made, for example, of $Li_{1+x}(Ni_{1/3}Mn_{1/3}Co_{1/3})_{1-x}O_2)$, and a graphite anode, is operated at 2.7 volts to 4.2 volts, which corresponds to the upper limit during charging and the lower limit during discharging. The voltage of a cell is the difference between the individual potentials of the electrodes:

Voltage of the cell=potential of the cathode−potential of the anode.

Under normal operating conditions, the potential of the cathode is between 2.9 volts and 4.2 volts with respect to elemental lithium. Under normal operating conditions, the potential of the anode is between 0.05 volts and 0.8 volts with respect to elemental lithium. However, if an equilibrium in the cell is not corrected, if, for example, a ratio of a capacity of the cathode to a capacity of the anode is not optimal, the potential of the anode may increase very rapidly. This results in a decrease in the overall voltage of the cell. A state in which the potential of the anode in a lithium cell which includes transition metal oxides and graphite increases to more than 2 volts compared with elemental lithium is referred to as deep discharge.

In the case of such a high potential of the anode, a solid electrolyte interfacial layer, also referred to as a solid electrolyte interface (SEI), which normally stabilizes the graphite in the anode, is irreversibly damaged. An exposed graphite surface then again comes into direct contact with the electrolyte, which results in additional undesirable parasitic reactions. These undesirable reactions may result in loss of electrolyte in the cell, gas formation, a decrease in a reversible capacity of the cell, formation of uneven SEI layers which are relevant for safety reasons, an increase in an internal impedance of the cell and/or increased resistance of the cell, and a reduction of the service life of the battery. If the potential of the anode during a deep discharge increases up to 3.5 volts compared with elemental lithium, copper which is contained in the current collector of the anode oxidizes and generates $Cu^{2+}$ ions, which dissolve in the electrolyte. These $Cu^{2+}$ ions are reduced to elemental copper in a subsequent charge/discharge cycle and may lead to serious internal short circuits in the cell or in the battery, thus possibly resulting in an explosion.

Generally, the battery management system (BMS) should detect such a sudden voltage drop in the cell and prevent a deep discharge of the cell. However, a change in the voltage may occur so rapidly that the cell is in the deep discharge state before the BMS is activated in order to prevent the deep discharge. In addition, such prevention of a deep discharge depends on the proper functioning of the BMS and cannot be guaranteed if the BMS fails.

Various electrodes are described in the related art.

US 2007/0148545 A1 describes electrode materials and lithium battery systems. A material contains lithium titanate having a plurality of primary particles and secondary particles, wherein an average size of the primary particles is between 1 nm and approximately 500 nm, and an average size of the secondary particles is between approximately 1 µm and approximately 4 µm. The lithium titanate may be coated with carbon. An electrode may contain a current collector and a binder, wherein the lithium titanate is applied to the current collector.

US 2001/0076523 A1 discloses a medical device including a lithium-ion battery. The lithium-ion battery includes a positive electrode having a current collector and a first active material, a negative electrode having a current collector and a second active material, and an auxiliary electrode having a current collector and a third active material. The current collector of the negative electrode may be made of titanium or a titanium-metal alloy. The current collector of the negative electrode may include a layer of an active material which may contain lithium titanate such as $Li_4Ti_5O_{12}$, instead of materials containing carbon. The third active material has a charge capacity and a discharge capacity below a corrosion potential of the current collector of the negative electrode and above a decomposition potential of the first active material. The auxiliary electrode may be selectively connected to the positive electrode or the negative electrode.

KR 2007-0108579 A describes a mixed material of a negative electrode, which contains composite nitrides containing lithium, wherein a discharge capacity of the composite nitrides is greater than a charge capacity of the composite nitrides, in order to prevent a discharge of a secondary battery. An active material of a negative electrode contains a composite nitride containing lithium or two or more composite nitrides containing lithium, which satisfy the formula $Li_{3-x}M_xN$. M corresponds to one, two, or more metals or transition metal elements selected from the group comprising Co, Ni, Fe, Cu, Zn, Cr, Cd, Zr, Mo, Ti, and V. x is greater than 0 and less than 3. Composite nitrides containing lithium have a high discharge capacity of between 0.5 volts and 3.0 volts.

In the related art, it is disadvantageous that a deep discharge is not satisfactorily prevented, an auxiliary electrode is required, or a difference between the discharge capacity and the charge capacity of the electrode material exists, so that the charge/discharge cycles are reversible only to a limited extent.

SUMMARY

In order to solve the aforementioned problems of the related art, the present disclosure provides an anode. An anode according to the present disclosure for a galvanic cell is made of an anode material which contains a main component which releases lithium ions during a discharge process of the galvanic cell, and at least one additive, wherein the at least one additive has an electrochemical potential which is higher, compared with elemental lithium, than an electrochemical potential of the main components, compared with elemental lithium, the at least one additive has a charge capacity and a discharge capacity, and the charge capacity does not deviate from the discharge capacity by more than 10%.

The anode material may also be referred to as a composite material, wherein the main component is an active material of the anode. Preferably, the charge capacity of the at least one additive does not deviate by more than 5% from the discharge capacity of the at least one additive, in particular preferably not by more than 3%.

In one preferred embodiment, the at least one additive reacts electrochemically if a voltage of 0.8 volts or greater, compared with elemental lithium, is present at the anode, and the at least one additive is chemically and electrochemically stable or reacts in an electrochemically reversible manner, if a voltage between 0.05 volts and 0.8 volts, compared with elemental lithium, is present at the anode. In the case of a discharge process under normal operating conditions, wherein the potential of the anode increases from 0.05 to 0.8 volts, compared with elemental lithium, the material of the main component reacts in particular, wherein the at least one additive remains chemically stable or reacts in an electrochemically reversible manner. If the potential of the anode increases further, the at least one additive begins to react electrochemically, at the latest if the potential has reached 2 volts, compared with elemental lithium. Preferably, the at least one additive already begins to react electrochemically if the potential of the anode is less than 2 volts but greater than 0.8 volts, compared with elemental lithium. For example, in the case of an increasing potential from a potential of the anode of 1.55 volts, compared with elemental lithium, lithium titanate $Li_7Ti_5O_{12}$ begins to react and to form $Li_4Ti_5O_{12}$.

In one preferred embodiment, the at least one additive and/or the main component and/or the cathode include a material which enables reaction mechanisms such as intercalation, insertion, conversion, and extrusion. Intercalation and insertion describe reactions which are generally reversible and wherein a penetration of an impurity atom into a host material causes no essential structural changes in the host material. Conversion is described in Nature, Issue 407, pp. 496 to 499, 2000, and refers to a reaction of two species, from which a formation of a product results which is different from the two species. An example reaction is: $CoO+2\ Li\rightarrow Li_2O+Co$. Extrusion is described in Nature Materials, Issue 2, pp. 755-761, 2003, and refers to an intercalation of impurity atoms into a host material, from which a deintercalation of an element of the host material results. For example, the deintercalation of metallic copper results from the intercalation of lithium into $Cu_{2.33}V_4O_{11}$. Furthermore, the at least one additive and/or the main component and/or the cathode may include alloys.

In one preferred embodiment, the at least one additive is selected from the spinel group or has a spinel-like structure. Spinels are a group of minerals which satisfy the general formula $[AB_2]O_4$, where A is a monovalent metal such as Li or a bivalent metal such as Mg, Fe, Zn, Mn, Co, Ni, Cu, Cd, and B is a trivalent or quadrivalent metal such as Al, Fe, V, Cr, Ti. In a spinel structure, at least two different types of cations are present, which have two different types of lattice positions, i.e., octahedrally and tetrahedrally coordinated point positions. The anions form a cubically closed lattice. Spinel-like structures are spinels which are doped with one or multiple cations or anions. They demonstrate a deformed structure in comparison to the spinel structure.

In another preferred embodiment, the at least one additive has a halite structure. Minerals having a halite structure satisfy the general formula [AB], where A is an element such as Na, Li, K, Ni, Mg, Ag, Ba, Co, Sr, and B is an element such as Cl, F, O, S. An example of a halite structure is nickel oxide.

In one particularly preferred embodiment, the at least one additive contains lithium titanate or nickel oxide or mixtures thereof. The proportion of lithium titanate or nickel oxide or mixtures thereof in the at least one additive is preferably at least 60% by weight, more preferably more than 80% by weight, and in particular preferably more than 95% by weight.

In one preferred embodiment, the lithium titanate is present as $Li_7Ti_5O_{12}$ if a voltage of less than 0.8 volts, compared with elemental lithium, is present at the anode. In a first charge process of the battery, lithium titanate in the form of $Li_4Ti_5O_{12}$ is lithiated into $Li_7Ti_5O_{12}$ at an average voltage of 1.55 volts, compared with elemental lithium. Under normal operating conditions of the battery, the lithium titanate continues to be present in lithiated form and is inactive. If the potential of the anode, compared with elemental lithium, becomes greater than 2 volts, i.e., if the battery enters a deep discharge state, the $Li_7Ti_5O_{12}$ is delithiated into $Li_4Ti_5O_{12}$.

In one preferred embodiment, the main component contains carbon, for example, graphite; silicon, tin, iron arsenide, lithium vanadium dioxide, metal alloys, or mixtures thereof. Preferably, the proportion of the aforementioned components of the main component is more than 60% by weight, preferably more than 80% by weight, and in particular more than 95% by weight.

In one preferred embodiment, the anode material has a content of the at least one additive of more than 0% by weight and less than 50% by weight, preferably more than 0.1% by weight and less than 30% by weight, in particular preferably more than 0.5% by weight and less than 10% by weight.

In one preferred embodiment, the at least one additive is blended with the main component. The at least one additive and the main component are thus mixed; macroscopically, a homogeneous material is present, not separate layers of the least one additive and the main component. An even mixture of the at least one additive with the main component is preferred.

According to the present disclosure, in addition, a galvanic cell having an anode according to the present disclosure is provided. The present disclosure is preferably used in lithium-ion battery cells. In one preferred embodiment, the galvanic cell does not include an auxiliary electrode. Electrodes which are contained in the galvanic cell are either anodes or cathodes. Elements may be constructed from multiple cells, which then each contain at least one electrode and at least one anode. In one preferred embodiment, a cathode of the galvanic cell contains lithium-metal oxides, lithium-metal phosphates, or mixtures thereof.

Table 1 shows normal operating conditions and possible embodiments of the anode according to the present disclosure and the galvanic cell according to the present disclosure, by way of example.

TABLE 1

| Main component | Potential of the anode, compared with elemental lithium, under normal operating conditions | Deep discharge range of the potential of the anode, compared with elemental lithium | Additive | Reaction potential of each additive, compared with elemental lithium |
|---|---|---|---|---|
| Graphite | 0.05 to 0.8 volts | At least 2.0 volts | $Li_4Ti_5O_{12}$/ NiO | 1.55 volts/ 1.6 volts |
| Silicon | 0 to 1.3 volts | At least 2.0 volts | $Li_4Ti_5O_{12}$/ NiO | 1.55 volts/ 1.6 volts |
| Tin | 0 to 1.2 volts | At least 2.0 volts | $Li_4Ti_5O_{12}$/ NiO | 1.55 volts/ 1.6 volts |
| FeAs | 0 to 1.5 volts | At least 2.0 volts | $Li_4Ti_5O_{12}$/ NiO | 1.55 volts/ 1.6 volts |
| $LiVO_2$ | 0 to 1.4 volts | At least 2.0 volts | $Li_4Ti_5O_{12}$/ NiO | 1.55 volts/ 1.6 volts |

The anode provided according to the present disclosure enables an increase in the service life of a battery and the safety of the battery during use. The at least one additive reacts before the battery reaches the deep discharge state and thus enables timely detection and prevention of the deep discharge state. Time is saved which is available to the battery management system for countermeasures such as deactivation or recharging. Irreparable damage to the anode or to other parts of the galvanic cell is prevented.

In addition to an active material of the anode and an active material of the cathode, the at least one additive constitutes a third potentially active material which is integrated into the anode. Therefore, no additional control unit, no additional monitoring system, and no network switch or switch or no diode or no additional passive material such as a conductor foil, for example, made of copper, is necessary. Through the use of a material having a spinel structure, which has highly similar charge capacities and discharge capacities and a long service life, protection from deep discharge is reversibly provided over thousands of charge/discharge cycles. Through a combination of two materials in one electrode, protection from deep discharge of the cell is thus guaranteed.

BRIEF DESCRIPTION OF THE DRAWINGS

Exemplary embodiments of the present disclosure are depicted in the drawings and are described in greater detail in the following description.

DETAILED DESCRIPTION

Figure 1:
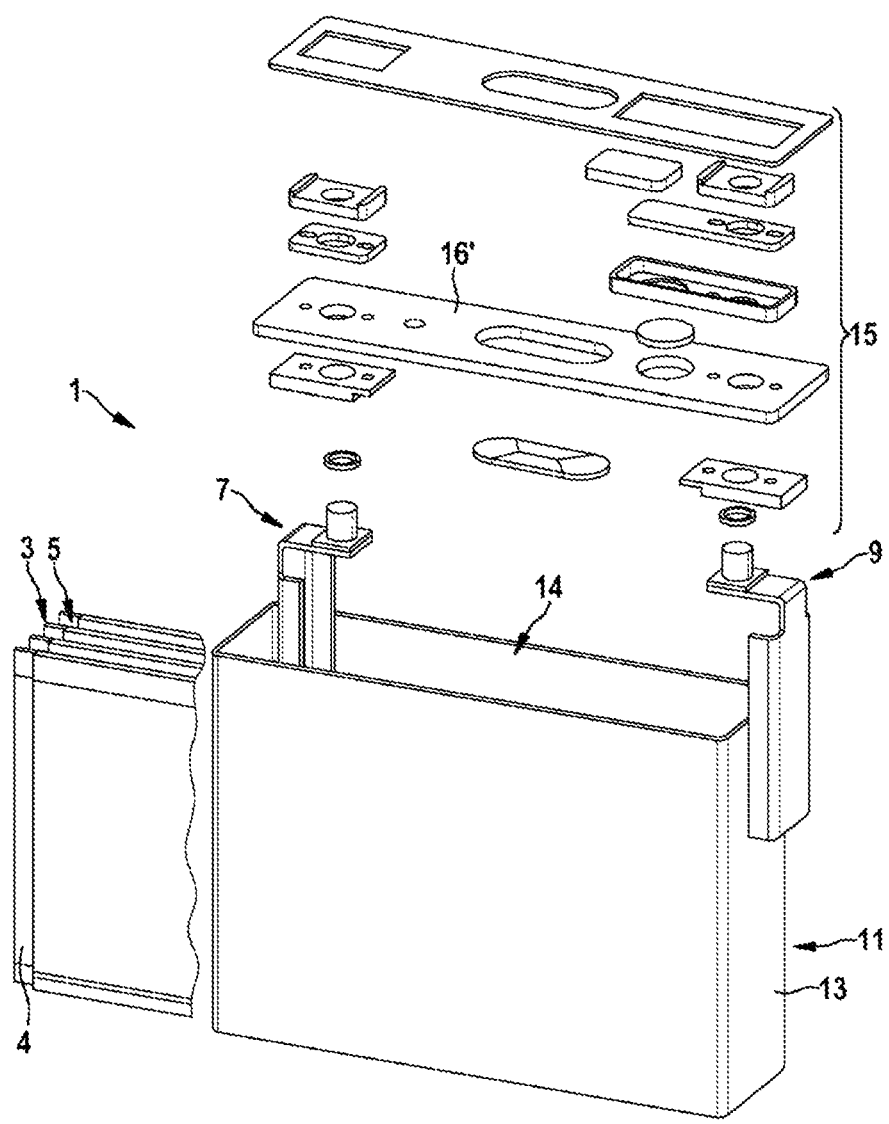
FIG. 1 shows a prismatic battery cell.

FIG. 1 shows a prismatic battery cell 1 in an exploded view. The prismatic battery cell 1 includes a winding element 3 having a wound layer stack 5, which comprises the anode and cathode. For making electrical contact, the anode and the cathode are stacked one above another in a slightly offset manner, in opposite directions along the winding axis, so the anode and cathode each protrude slightly over a respective edge of the winding element 3 on opposite narrow sides. A current collector 7 is welded at a protruding edge area 4, so that the current collector 7 is electrically connected to the anode of the winding element 3. A second current collector 9 is welded at the opposite edge area in order to establish electrical contact with the cathode of the winding element 3. The winding element 3 provided with the current collectors 7 and 9 is situated in a hermetically sealed cell housing 11 in which liquid electrolyte is present. The rectangular-shaped cell housing 11 includes a container 13 which is open upwardly, and a cover assembly 15 tightly closing the upper opening 14 of the container 13. The cover assembly 15 includes a plurality of components, inter alia a cover plate 16 as a main component. Additional components of the cover assembly 15 shown in FIG. 1 are used for passage of a contact assembly for making electrical contact, which extends outwardly.

Figure 2:
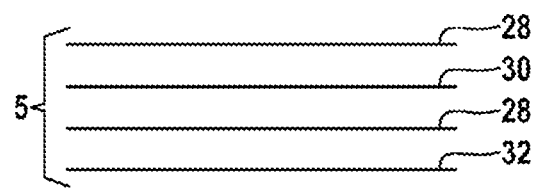
FIG. 2 shows a cross section of a layer stack.

FIG. 2 shows a cross section of the layer stack 5 which is contained in the winding element 3. The layer stack 5 comprises two separator layers 28, a cathode layer 30, and an anode layer 32.

Figure 3:
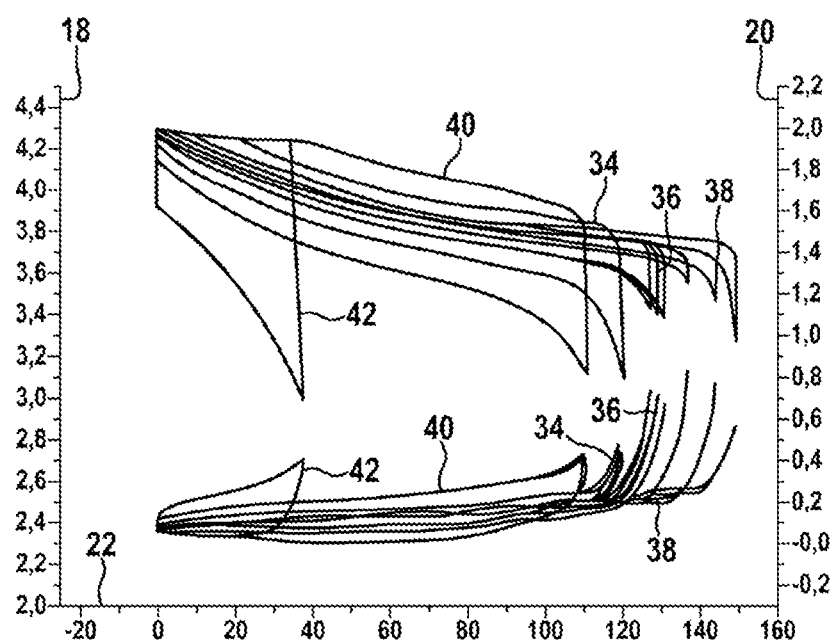
FIG. 3 shows potentials of the anode and cathode at different charge currents.

FIG. 3 shows potentials 18, 20 of the cathode and the anode as a function of a specific capacity 22 of the cathode during charging and discharging at different charging currents in conventional battery cells. On a first ordinate, a potential 18 of the cathode, and on a second ordinate, a potential 20 of the anode, are plotted in volts in each case, as a function of the specific capacity 22 of the cathode in mAh/g. In the first case 34, the charging current corresponds to the battery capacity C; in a second case 36, the charging current is twice as great as the battery capacity C, and in a third case 38, the charging current is five times as great as the battery capacity C. In a fourth case 40, the charging current is ⅓ of the battery capacity C, and in a fifth case 42, the charging current is 1/10 of the battery capacity C. Under normal operating conditions, the potential 18 of the cathode is between 4.2 volts and 2.9 volts, while the potential 20 of the anode is between 0.05 and 0.8 volts, compared with elemental lithium, in each case. If the capacity of the cathode and the capacity of the anode are not optimally matched to each other, a very rapid increase in the potential of the anode 20 may occur, resulting in a decrease in the cell voltage overall.

Figure 4:
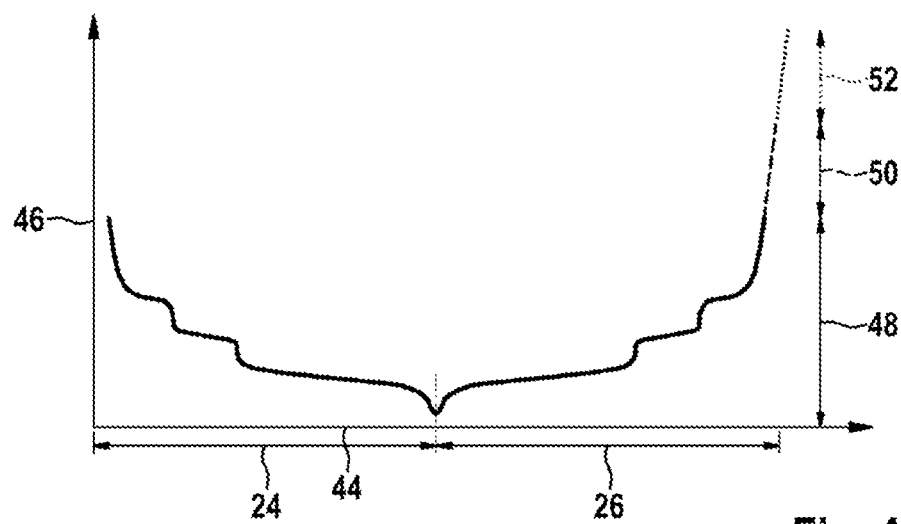
FIG. 4 shows a potential profile of an anode of the related art during charging and discharging.

In FIG. 4, a potential 46 of a graphite-based anode of the related art is plotted on the ordinate in volts, over time 44 in hours. A charge process 24 and a discharge process 26 are depicted. In a potential range between 0.05 volts and 0.8 volts, compared with elemental lithium, the anode is in a normal operating state 48. A sudden voltage increase 50 may occur, so that the potential 46 is between 0.8 volts and 2 volts, compared with elemental lithium. If the potential 46 increases further to more than 2 volts, compared with elemental lithium, a state of deep discharge 52 exists.

Figure 5:
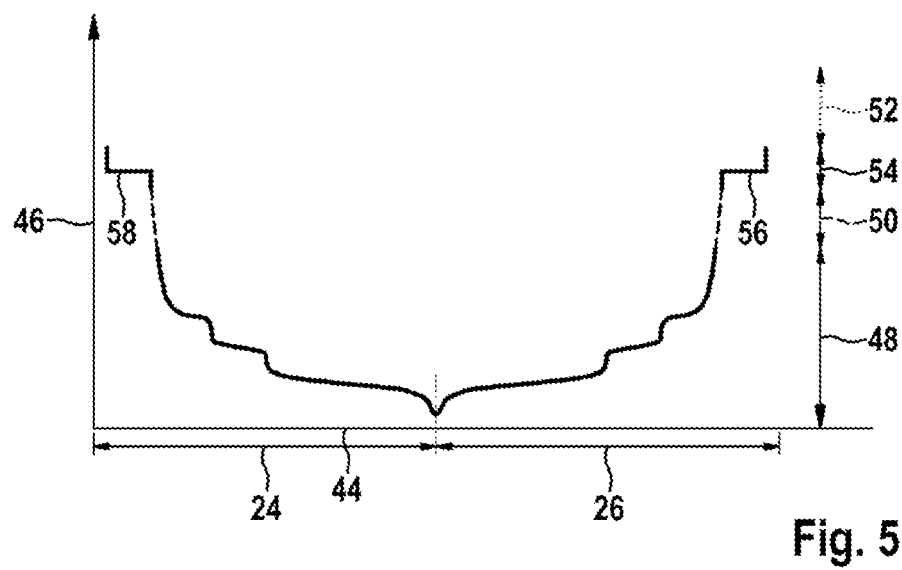
FIG. 5 shows a potential profile of an anode according to the present disclosure during charging and discharging.

In FIG. 5, as in FIG. 4, a charge process 24 and a discharge process 26 of an anode are depicted, differing in that an anode according to the present disclosure containing at least one additive was used, instead of an anode of the related art, wherein the at least one additive had an electrochemical potential which is higher, compared with elemental lithium, than an electrochemical potential of the main component, compared with elemental lithium; the at least one additive had a charge capacity and a discharge capacity, and the charge capacity deviated by not more than 10% from the discharge capacity. Unlike FIG. 4, a range of a voltage stabilization 54 between 1.2 volts and 1.8 volts, compared with elemental lithium, follows the range of a sudden voltage increase 50, which relates here to a potential range between 0.8 volts and 1.2 volts, compared with elemental lithium. During this voltage stabilization 54, the at least one additive is active and is delithiated. A voltage plateau 56 is formed, since the potential 46 of the anode remains constant over a certain time, while the at least one additive reacts. The state of the deep discharge 52 at more than 2 volts compared with elemental lithium follows the state of the voltage stabilization 54 only if all material of the at least one additive in the anode has reacted. The voltage plateau 56 clearly illustrates the saved time which is available to the battery management system in order to detect the sudden voltage increase 50 and to prevent a hazard by deactivating the battery or by other means. A second voltage plateau 58 results due to the fact that, during a first charging of the battery, for example, $Li_4Ti_5O_{12}$ is initially lithiated at 1.5 volts, compared with elemental lithium, into $Li_7Ti_5O_{12}$. The potential 46 decreases further during the charge process 24, as soon as the at least one additive in the anode has been fully lithiated. Depending on the quantity of the at least one additive contained in the anode, the voltage plateaus 56 and 58 are longer or shorter, and may be between a few minutes or several tens of minutes.

The invention claimed is:

1. An anode for a galvanic cell, the anode comprising:
    an anode material, containing:
        a main component which releases lithium ions during a discharge process of the galvanic cell, and
        at least one additive,
    wherein the at least one additive has an electrochemical potential which is higher, compared with elemental lithium, than an electrochemical potential of the main component, compared with elemental lithium, the at least one additive has a charge capacity and a discharge capacity, and the charge capacity does not deviate from the discharge capacity by more than 10%, wherein the at least one additive contains a mixture of lithium titanate and nickel oxide.

2. The anode as claimed in claim 1, wherein the at least one additive reacts electrochemically if a voltage between 0.8 volts and 2 volts, compared with elemental lithium, is present at the anode.

3. The anode as claimed in claim 1, wherein the at least one additive has one of: a spinel structure, a spinel-like structure, and a halite structure.

4. The anode as claimed in claim 1, wherein the lithium titanate is present as $Li_7Ti_5O_{12}$ if a voltage of less than 0.8 volts, compared with elemental lithium, is present at the anode.

5. The anode as claimed in claim 1, wherein the main component contains carbon, silicon, tin, iron arsenide, lithium vanadium dioxide, metal alloys, or mixtures thereof.

6. The anode as claimed in claim 1, wherein the anode material contains the at least one additive in an amount of more than 0% by weight and less than 50% by weight.

7. The anode as claimed in claim 1, wherein the at least one additive is blended with the main component.

8. A galvanic cell, comprising:
    an anode made of an anode material, the anode material containing:
        a main component which releases lithium ions during a discharge process of the galvanic cell; and
        at least one additive,
    wherein the at least one additive has an electrochemical potential which is higher, compared with elemental lithium, than an electrochemical potential of the main component, compared with elemental lithium,
    wherein the at least one additive has a charge capacity and a discharge capacity, and the charge capacity does not deviate from the charge capacity by more than 10%,
    wherein the at least one additive contains a mixture of lithium titanate and nickel oxide, and
    wherein the lithium titanate is present as $Li_7Ti_5O_{12}$ if a voltage of less than 0.8 volts, compared with elemental lithium, is present at the anode.

9. The galvanic cell as claimed in claim 8, wherein the galvanic cell does not include an auxiliary electrode.

10. The galvanic cell as claimed in claim 8, further comprising:
    at least one cathode containing lithium-metal oxides, lithium-metal phosphates, or mixtures thereof.

* * * * *